United States Patent
Aoi et al.

(10) Patent No.: US 10,608,494 B2
(45) Date of Patent: Mar. 31, 2020

(54) STATOR UNIT, MOTOR, AND METHOD OF MANUFACTURING STATOR UNIT

(71) Applicant: Nidec Corporation, Kyoto (JP)

(72) Inventors: Hideki Aoi, Kyoto (JP); Kazuhiro Ono, Kyoto (JP); Jumpei Kitamura, Kyoto (JP); Junya Matsuyama, Kyoto (JP); Sakae Nogami, Kyoto (JP); Megumi Michishita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 179 days.

(21) Appl. No.: 15/828,604

(22) Filed: Dec. 1, 2017

(65) Prior Publication Data

US 2018/0166942 A1    Jun. 14, 2018

(30) Foreign Application Priority Data

Dec. 12, 2016  (JP) ................. 2016-240082

(51) Int. Cl.
| | |
|---|---|
| *H02K 5/10* | (2006.01) |
| *H02K 15/12* | (2006.01) |
| *H02K 11/33* | (2016.01) |
| *H02K 5/02* | (2006.01) |
| *H02K 5/08* | (2006.01) |
| *H02K 15/03* | (2006.01) |
| *H02K 15/14* | (2006.01) |
| *H02K 21/22* | (2006.01) |

(52) U.S. Cl.
CPC ............ *H02K 5/10* (2013.01); *H02K 5/02* (2013.01); *H02K 5/08* (2013.01); *H02K 11/33* (2016.01); *H02K 15/03* (2013.01); *H02K 15/12* (2013.01); *H02K 15/14* (2013.01); *H02K 21/22* (2013.01); *H02K 2205/00* (2013.01)

(58) Field of Classification Search
CPC .. H02K 5/02; H02K 5/08; H02K 5/10; H02K 15/03; H02K 15/14; H02K 15/12; H02K 11/33; H02K 2205/00; H02K 21/22
See application file for complete search history.

(56) References Cited

U.S. PATENT DOCUMENTS

| | | | |
|---|---|---|---|
| 2011/0193430 A1* | 8/2011 | Takada ............ | H02K 3/44 310/43 |
| 2013/0017103 A1* | 1/2013 | Kodama .......... | B60T 8/368 417/410.1 |
| 2014/0314596 A1* | 10/2014 | Kudo ............... | H02K 5/10 417/420 |

(Continued)

FOREIGN PATENT DOCUMENTS

| | | |
|---|---|---|
| CN | 106163197 A | 11/2016 |
| JP | 6-178484 A | 6/1994 |
| JP | 7-12654 U | 3/1995 |

(Continued)

*Primary Examiner* — Naishadh N Desai
(74) *Attorney, Agent, or Firm* — Keating & Bennett (57) ABSTRACT

A stator unit included in a motor includes a base member, an armature, a circuit board, and a mold resin portion. The base member extends substantially perpendicularly to a vertically extending center axis. The armature and the circuit board are positioned above the base member. The circuit board is electrically connected to the armature. The mold resin portion covers the armature and the circuit board. In a process of forming the mold resin portion, the base member is firstly supported by a first mold.

16 Claims, 9 Drawing Sheets

(56) References Cited

U.S. PATENT DOCUMENTS

2016/0094104 A1\* 3/2016 Yamasaki ................ H02K 5/10
310/68 D

FOREIGN PATENT DOCUMENTS

| JP | 3000903 B2 | 1/2000 |
|----|------------|--------|
| JP | 2002-176744 A | 6/2002 |
| JP | 2005-168186 A | 6/2005 |
| JP | 2005-168224 A | 6/2005 |
| JP | 2010-104213 A | 5/2010 |
| JP | 2016-103944 A | 6/2016 |

\* cited by examiner

STATOR UNIT, MOTOR, AND METHOD OF MANUFACTURING STATOR UNIT

CROSS REFERENCE TO RELATED APPLICATIONS

This application claims the benefit of priority to Japanese Patent Application No. 2016-240082 filed on Dec. 12, 2016. The entire contents of this application are hereby incorporated herein by reference.

BACKGROUND OF THE INVENTION

1. Field of the Invention

The present disclosure relates to a stator unit, a motor, and a method of manufacturing a stator unit.

2. Description of the Related Art

A known so-called molded motor includes a mold resin portion that covers a stator. Such a molded motor has excellent waterproofness and excellent characteristics in suppressing vibration and sound that are generated when the motor is driven. In particular, the molded motor is configured such that the mold resin portion prevents water drops from entering areas where electrical elements such as coils of the stator are provided. An exemplary molded motor is disclosed by Japanese Laid-open Patent Application Publication H06-178484.

In a step of forming the mold resin portion, an assembly including a stator and a base member that supports the stator is placed between a pair of molds. Then, molten resin is injected into a cavity provided between the pair of molds. In this step, part of the base member is held between the pair of molds. Therefore, if the fastening pressure applied to the pair of molds is too high, the base member may be damaged with the load applied from the molds.

The present disclosure provides a structure configured such that a base member is prevented from being damaged under a load applied from molds in a step of forming a mold resin portion. The present disclosure also provides a method of manufacturing such a structure.

SUMMARY OF THE INVENTION

According to an exemplary embodiment of the disclosure, there is provided a stator unit included in a motor. The stator unit includes a base member extending substantially perpendicularly to a center axis extending vertically, an armature positioned above the base member, a circuit board positioned above the base member and electrically connected to the armature, and a mold resin portion covering the armature and the circuit board. The base member has an elastic member on a radially outer side with respect to the circuit board in plan view. At least part of the elastic member is positioned on the radially outer side with respect to the mold resin portion.

According to another exemplary embodiment of the disclosure, there is provided a method of manufacturing a stator unit that includes a base member extending substantially perpendicularly to a center axis extending vertically, an armature and a circuit board both positioned above the base member, and a mold resin portion covering the armature and the circuit board. The method includes a) supporting the base member with a first mold, b) joining the first mold to a second mold such that a cavity is provided between the first mold and the second mold, and c) injecting molten resin into the cavity. In step b), the second mold is pressed against an upper surface of the base member with an elastic member interposed between the base member and the second mold, the elastic member being positioned on a radially outer side with respect to the circuit board in plan view.

According to the above exemplary embodiments of the disclosure, in the process of forming the mold resin portion, the elastic member is interposed between the upper surface of the base member and the second mold, and the elastic member is compressed. Thus, the load applied to the base member is reduced. Consequently, the occurrence of damage to the base member under the pressure applied from the mold is suppressed.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

An exemplary embodiment of the present disclosure will now be described with reference to the drawings. Herein, a direction parallel to the center axis of a motor including a stator unit is defined as "the axial direction," a direction orthogonal to the center axis of the motor is defined as "the radial direction," and a direction in which a circular arc around the center axis of the motor extends is defined as "the peripheral direction." Furthermore, the shapes and relative positions of individual elements will be described on the premise that the axial direction corresponds to the vertical direction, and a side of a base member that is nearer to an armature is defined as the upper side. Note that the definition of the vertical direction does not limit the orientation of the motor according to the present disclosure in the manufacturing process and in the state of use.

Figure 1:
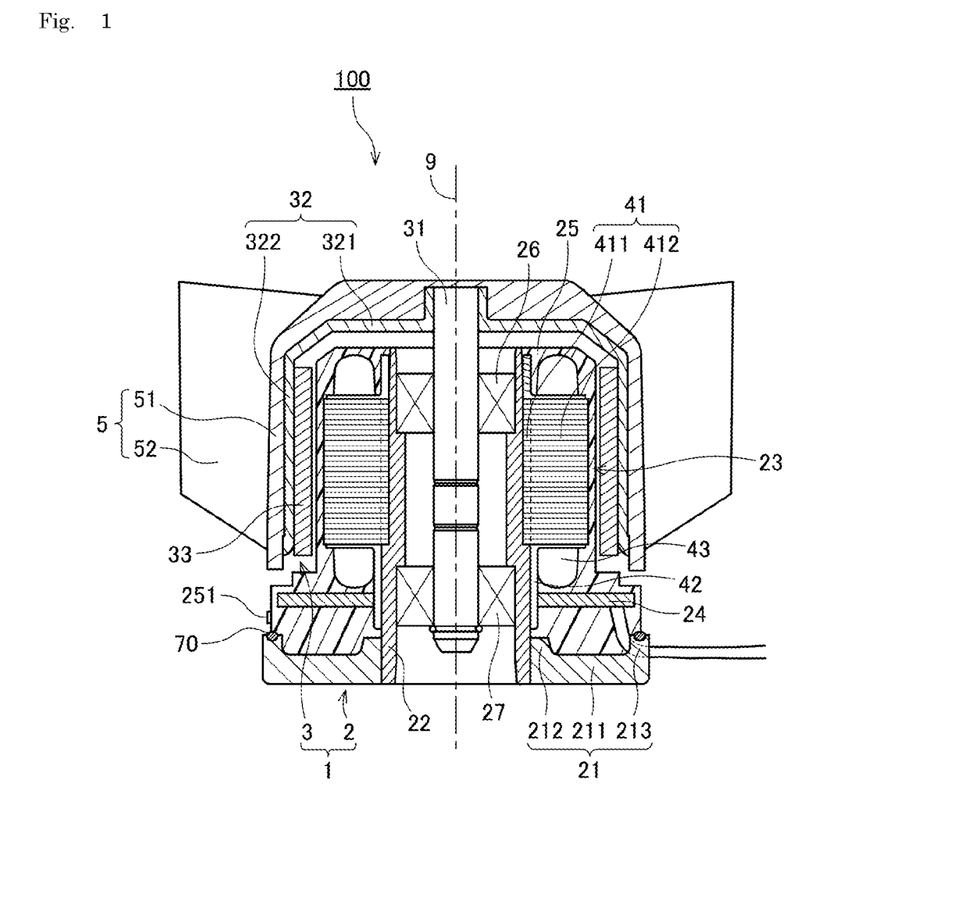
FIG. 1 is a vertical sectional view of a motor according to an embodiment.

FIG. 1 is a vertical sectional view of an axial-flow fan 100 including a motor 1 according to an embodiment of the present disclosure. The axial-flow fan 100 is used as, for example, an apparatus for supplying a flow of cooling air in a communication base station equipped with a plurality of electronic devices. Note that the stator unit and the motor according to the present disclosure may alternatively be applied to other appliances such as home appliances and onboard components.

Referring to FIG. 1, the motor 1 includes a stator unit 2 and a rotor unit 3. The stator unit 2 is fixed to a frame of an apparatus to which the motor 1 is provided. The rotor unit 3 is supported by an upper bearing 26 and a lower bearing 27 in such a manner as to be rotatable relative to the stator unit 2.

The stator unit 2 includes a base member 21, a bearing housing 22, a stator 23, a circuit board 24, and a mold resin portion 25.

The base member 21 is provided below the stator 23 and extends substantially perpendicularly to a center axis 9. The base member 21 is made of resin. The base member 21 is connected to a cylindrical casing (not illustrated) with a plurality of ribs interposed therebetween. The cylindrical casing provides a wind tunnel of the axial-flow fan 100. The base member 21, the plurality of ribs, and the casing may be integrated together as a single member or may be provided as separate members.

The base member 21 according to the embodiment includes a disc portion 211, an inner wall portion 212, and an outer wall portion 213. The disc portion 211 extends annularly around the bearing housing 22 and perpendicularly to the center axis 9. The inner wall portion 212 has an annular shape and projects upward from a radially inner end of the disc portion 211. The inner wall portion 212 is fixed to the outer peripheral surface of the bearing housing 22. The outer wall portion 213 has an annular shape and projects upward from a radially outer end of the disc portion 211.

The bearing housing 22 is a cylindrical member extending vertically along the center axis 9. The bearing housing 22 is positioned on the radially inner side with respect to the base member 21, the stator 23, and the circuit board 24 and on the radially outer side with respect to the upper bearing 26 and the lower bearing 27. The bearing housing 22 is made of metal such as brass or iron. The lower end of the bearing housing 22 is fixed to the inner periphery of the base member 21.

The base member 21 is obtained by injecting molten resin into a mold in which the bearing housing 22 is placed in advance and then curing the resin. That is, the base member 21 is a molded resin component integrated with the bearing housing 22 by injection molding. The base member 21 is fixed to the bearing housing 22 when molded. Note that the base member 21 may be fixed to the bearing housing 22 by another method using adhesive or the like.

While the embodiment is described on the premise that the bearing housing is made of metal and the base member is made of resin, the present disclosure is not limited to such an embodiment. Specifically, the bearing housing and the base member may be integrated together into a single resin member. In such a case, the number of components is smaller than in the case where the bearing housing and the base member are provided as separate members, and the productivity is therefore increased.

The stator 23 is an armature that generates a rotating magnetic field corresponding to the driving current thereof. The stator 23 is positioned above the base member 21 and the circuit board 24 and on the radially outer side with respect to the bearing housing 22. The stator 23 includes a stator core 41, an insulator 42, and a plurality of coils 43. The stator core 41 is formed of lamination steel that is a magnetic body. The stator core 41 includes a core back 411 having an annular shape, and a plurality of teeth 412. The inner peripheral surface of the core back 411 is fixed to the outer peripheral surface of the bearing housing 22. The teeth 412 each projects radially outward from the core back 411.

The insulator 42 is attached to the stator core 41. The upper surface, the lower surface, and the two side surfaces, in the peripheral direction, of each of the teeth 412 are covered with the insulator 42. The insulator 42 is made of resin, which is an insulating material. The coils 43 are each formed of a conducting wire wound around a corresponding one of the teeth 412 with the insulator 42 interposed therebetween. The insulator 42 is interposed between the stator core 41 and the coil 43, thereby preventing the electrical short circuit between the stator core 41 and the coil 43.

The circuit board 24 is positioned below the stator 23 and above the base member 21. The circuit board 24 extends annularly around the bearing housing 22 and perpendicularly to the center axis 9. The circuit board 24 carries an electric circuit on at least one of the upper surface and the lower surface thereof. An end of the conducting wire forming each of the coils 43 is electrically connected to the electric circuit on the circuit board 24 with a terminal pin (not illustrated) interposed therebetween. When electric power is supplied to the circuit board 24 from an external power source, a driving current is supplied from the electric circuit on the circuit board 24 to the plurality of coils 43.

The mold resin portion 25 covers the stator core 41, the insulator 42, the plurality of coils 43, and the circuit board 24. The mold resin portion 25 is made of, for example, thermosetting unsaturated polyester resin. The mold resin portion 25 is obtained by injecting molten resin into a cavity provided in a mold in which the base member 21, the bearing housing 22, the stator 23, and the circuit board 24 are placed and then curing the resin. That is, the mold resin portion 25 is integrated with the base member 21, the bearing housing 22, the stator 23, and the circuit board 24 into a single molded resin component by resin molding.

Since the stator 23 and the circuit board 24 are covered with the mold resin portion 25 as described above, the contact of water drops with the stator 23 and the circuit board 24 is suppressed. Accordingly, the occurrence of malfunctions of the electric elements in the motor 1 that may be attributed to the contact with water drops is suppressed. Note that part of the surface of the stator 23 may be exposed from the mold resin portion 25. For example, the radially outer end surface of each of the teeth 412 and the inner peripheral surface of the insulator 42 may be exposed from the mold resin portion 25. In such a case, the radially outer end surface of each of the teeth 412 and the inner peripheral surface of the insulator 42 only need to be covered with an insulating coating. Thus, even if those surfaces are exposed from the mold resin portion 25, the occurrence of malfunctions attributed to the contact with water drops is suppressed.

The upper bearing 26 and the lower bearing 27 form a mechanism that supports a shaft 31, to be described below, such that the shaft 31 is rotatable. The lower bearing 27 is interposed between a lower end portion of the shaft 31 and the bearing housing 22. The upper bearing 26 is positioned above the lower bearing 27 and is interposed between the shaft 31 and the bearing housing 22. The upper bearing 26 and the lower bearing 27 are each, for example, a ball bearing including an inner race and an outer race that are rotatable relative to each other with the aid of balls. The outer race of the upper bearing 26 and the outer race of the lower bearing 27 are fixed to the inner peripheral surface of the bearing housing 22. The inner race of the upper bearing 26 and the inner race of the lower bearing 27 are fixed to the outer peripheral surface of the shaft 31. Hence, the shaft 31 is supported in such a manner as to be rotatable about the center axis 9 and relative to the bearing housing 22.

Alternatively, the upper bearing 26 and the lower bearing 27, which are ball bearings, may be replaced with bearings of another type.

The rotor unit 3 includes the shaft 31, a rotor holder 32, and a plurality of magnets 33.

The shaft 31 is a columnar member extending along the center axis 9. The shaft 31 is made of metal such as stainless steel. A portion of the shaft 31 including the lower end thereof is positioned on the radially inner side with respect to the bearing housing 22. The upper end of the shaft 31 projects upward above the bearing housing 22 and the stator 23. The shaft 31 is rotatably supported by the upper bearing 26 and the lower bearing 27.

The rotor holder 32 is a member that rotates with the shaft 31. The rotor holder 32 is made of metal such as iron, which is a magnetic material. The rotor holder 32 includes a holder top-plate portion 321 and a holder cylindrical portion 322. The holder top-plate portion 321 extends substantially perpendicularly to the center axis 9. A central portion of the holder top-plate portion 321 is fixed to the shaft 31. The holder cylindrical portion 322 extends downward from the outer periphery of the holder top-plate portion 321 and in a cylindrical shape.

The plurality of magnets 33 are fixed to the inner peripheral surface of the holder cylindrical portion 322. The radially inner surface of each of the magnets 33 forms an N- or S-pole face. The plurality of magnets 33 are arranged in the peripheral direction such that the N-pole faces and the S-pole faces are positioned alternately. The radially outer end surfaces of the respective teeth 412 face the radially inner surfaces of the respective magnets 33 in the radial direction.

To drive the motor 1, a driving current is supplied from the circuit board 24 to the coils 43 through the terminal pins. Then, a rotating magnetic field is generated around the plurality of teeth 412 of the stator core 41. Thus, a torque acting in the peripheral direction is generated between the teeth 412 and the magnets 33. Consequently, the rotor unit 3 rotates about the center axis 9.

The axial-flow fan 100 includes an impeller 5. The impeller 5 includes an impeller cup 51 and a plurality of blades 52. The impeller cup 51 is fixed to the rotor holder 32. The plurality of blades 52 extend radially outward from the outer peripheral surface of the impeller cup 51. When the motor 1 is driven, the rotor unit 3 rotates together with the impeller 5. Thus, air currents flowing from the upper side toward the lower side are generated around the axial-flow fan 100.

Figure 2:
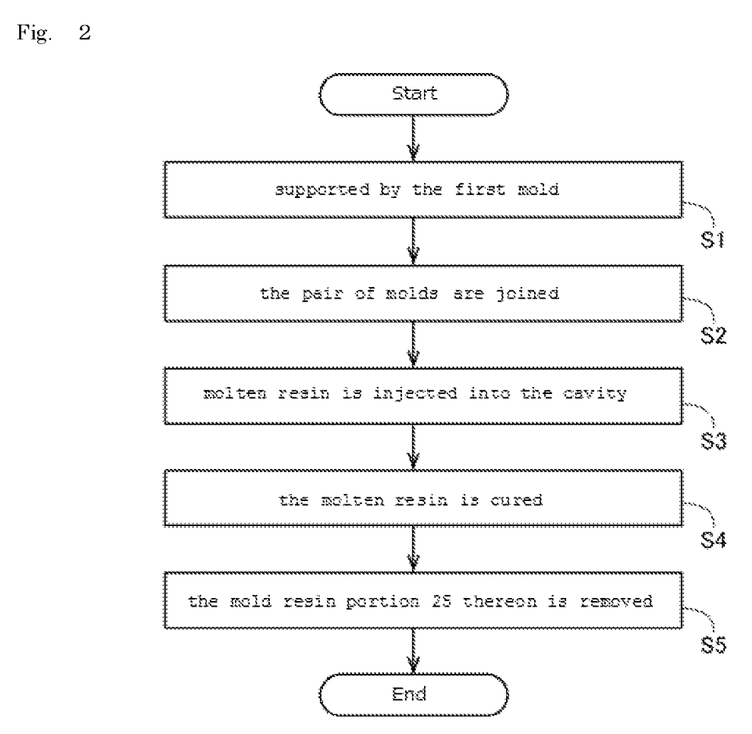
FIG. 2 is a flow chart illustrating a process of forming a mold resin portion.
Figure 3:
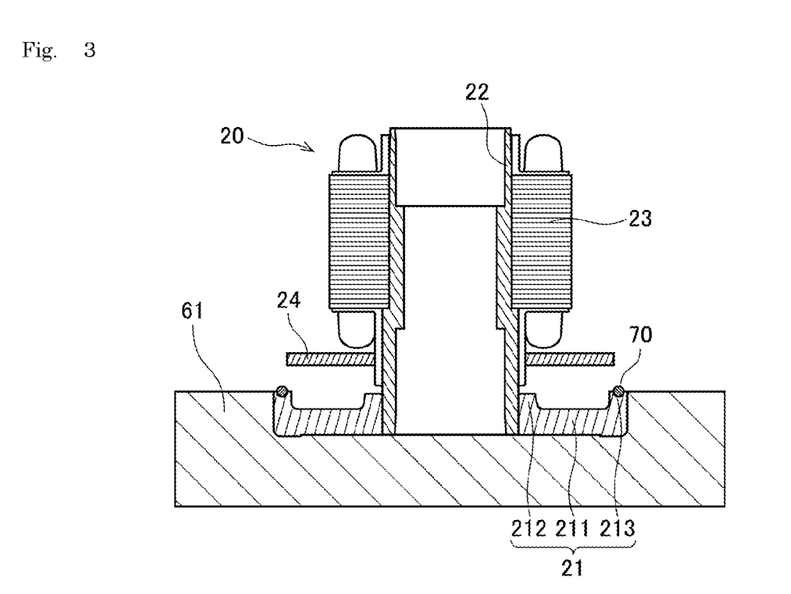
FIG. 3 illustrates a state in the process of forming the mold resin portion.
Figure 4:
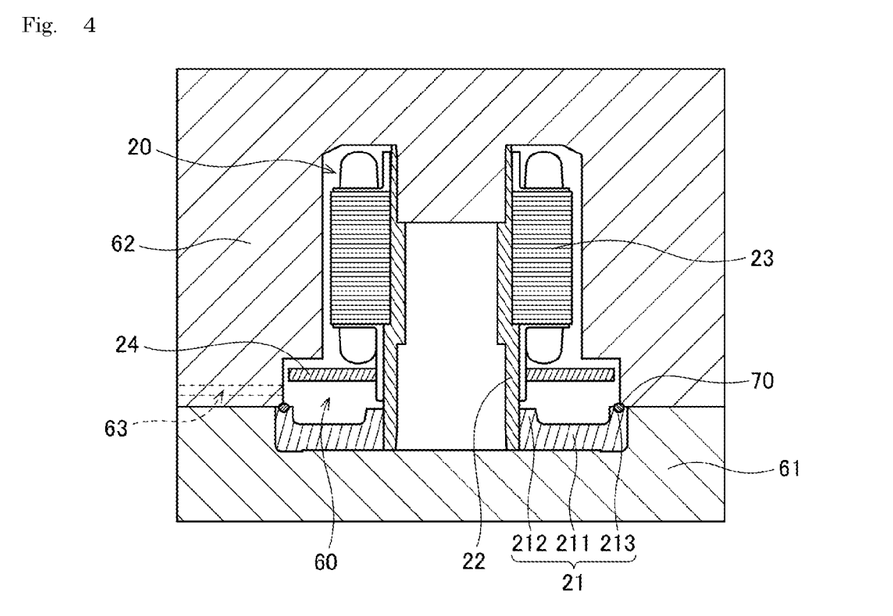
FIG. 4 illustrates another state in the process of forming the mold resin portion.
Figure 5:
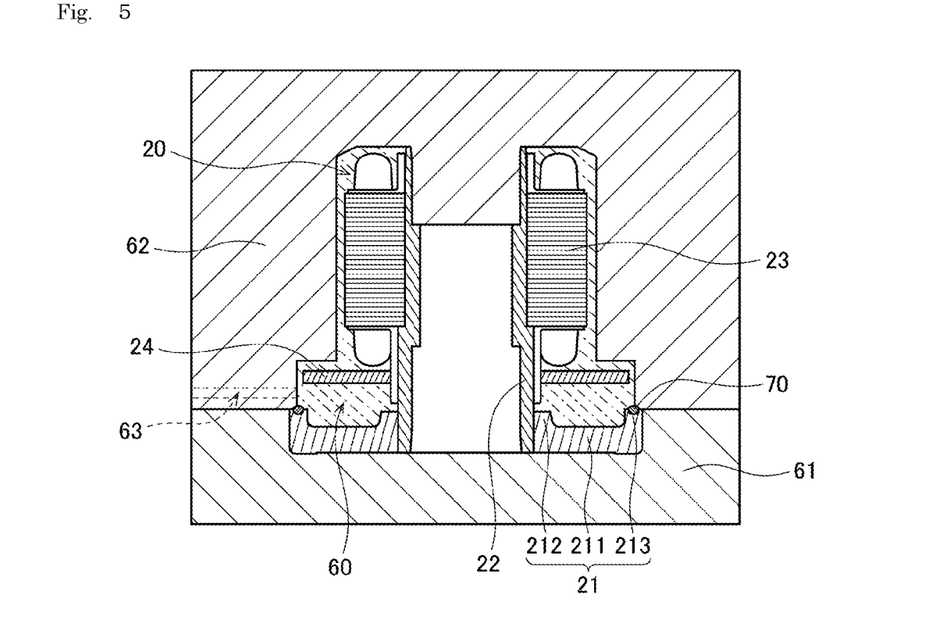
FIG. 5 illustrates yet another state in the process of forming the mold resin portion.

Now, a process of forming the mold resin portion 25 will be described in detail. FIG. 2 is a flow chart illustrating the process of forming the mold resin portion 25. FIGS. 3 to 5 illustrate different states in the process of forming the mold resin portion 25.

First, an assembly 20 including the base member 21, the bearing housing 22, the stator 23, and the circuit board 24 is prepared. Then, the assembly 20 is placed between a first mold 61 and a second mold 62. Specifically, referring to FIG. 3, the base member 21 is fitted into the first mold 61 such that the lower surface and the outer peripheral surface thereof are in contact with the first mold 61, whereby the base member 21 is supported by the first mold 61 (step S1). Then, referring to FIG. 4, upper part of the assembly 20 is covered with the second mold 62, whereby the pair of molds 61 and 62 are joined (step S2). Accordingly, a cavity 60 is provided between the first mold 61 and the second mold 62 that have been joined. The assembly 20 is positioned in the cavity 60.

Subsequently, molten resin is injected into the cavity 60 (step S3). As represented by broken lines in FIGS. 4 and 5, the second mold 62 has a gate 63 serving as a supply port from which the molten resin is injected. The molten resin is injected into the cavity 60 from the outside of the first mold 61 and the second mold 62 through the gate 63. When the molten resin has spread all over the cavity 60 as illustrated in FIG. 5, the molten resin is cured by heating or the like (step S4). The molten resin thus cured serves as the mold resin portion 25. The molten resin is injected into the cavity 60 with a predetermined pressure by an injection-molding device. By the injection with the predetermined pressure, the molten resin can spread evenly all over the cavity 60. The injection method is not limited to such a method. The molten resin may be injected into the cavity 60 by another method, instead of using the injection-molding device.

Subsequently, the first mold 61 and the second mold 62 are undone, and the assembly 20 now having the mold resin portion 25 thereon is removed from the first mold 61 and the second mold 62 (step S5).

Figure 6:
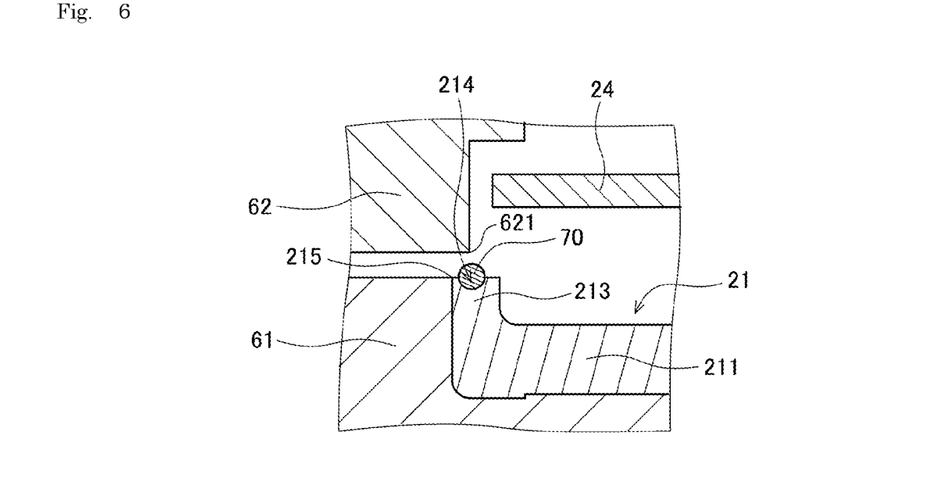
FIG. 6 is a vertical sectional view of relevant part of the motor and illustrates a base member, a circuit board, a first mold, and a second mold.
Figure 7:
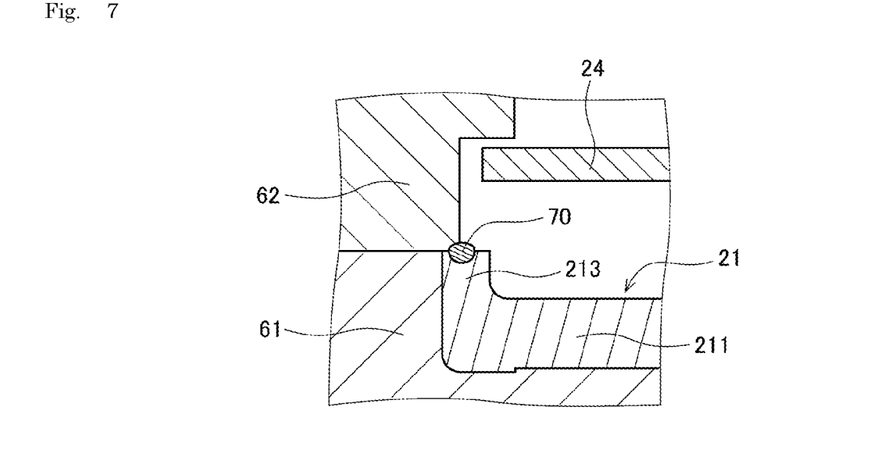
FIG. 7 is another vertical sectional view of the relevant part of the motor and illustrates the base member, the circuit board, the first mold, and the second mold.
Figure 8:
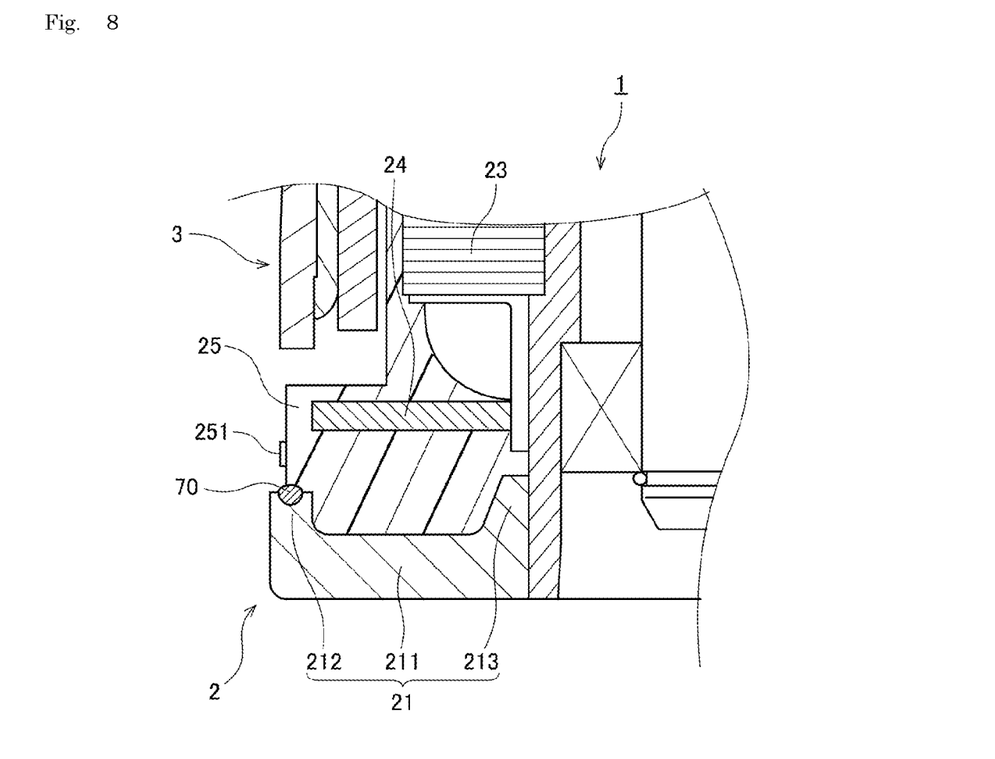
FIG. 8 is a vertical sectional view of relevant part of a finished motor.
Figure 9:
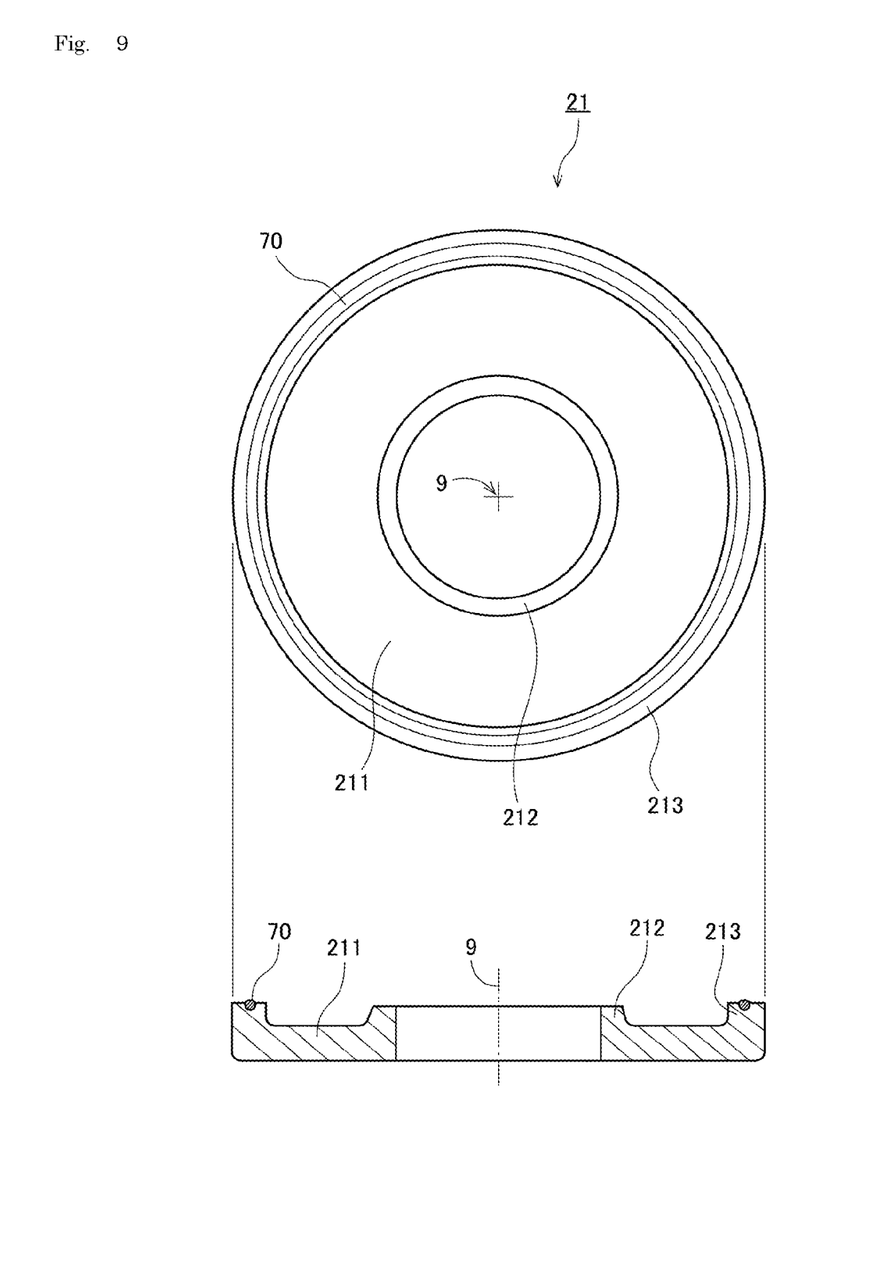
FIG. 9 includes a top view and a vertical sectional view of the base member.

FIGS. 6 and 7 are vertical sectional views of relevant part of the motor 1 and illustrate the base member 21, the circuit board 24, the first mold 61, and the second mold 62. FIG. 6 illustrates a state before the first mold 61 and the second mold 62 come into contact with each other. FIG. 7 illustrates a state after the first mold 61 and the second mold 62 have come into contact with each other. FIG. 8 is a vertical sectional view of relevant part of a finished motor 1. FIG. 9 includes a top view and a vertical sectional view of a finished base member 21.

Referring to FIGS. 6 to 9, an O ring 70 is provided on the upper surface of the outer wall portion 213 of the base member 21. The O ring 70 is a ring-shaped resin member (an elastic member) that is easier to undergo elastic deformation than the base member 21 and the second mold 62. The O ring 70 is made of, for example, elastomer. As illustrated in FIG. 9, the O ring 70 has an annular shape that is centered at the center axis 9.

In the embodiment, the base member 21 has a groove 214 in the upper surface of the outer wall portion 213 thereof. Lower part of the O ring 70 is fitted in the groove 214. Since part of the O ring 70 is fitted in the groove 214, the displacement of the O ring 70 is suppressed. Furthermore, the positioning of the O ring 70 in the manufacturing process is easy. The surface of the groove 214 and the O ring 70 are fixed to each other with, for example, adhesive. Upper part of the O ring 70 projects upward from the upper surface of the outer wall portion 213. In plan view, the groove 214 and the O ring 70 are positioned on the radially outer side with respect to the circuit board 24.

When the first mold 61 and the second mold 62 are joined together, the O ring 70 is interposed between the upper surface of the outer wall portion 213 and the lower surface of the second mold 62. Thus, the second mold 62 is pressed against the upper surface of the outer wall portion 213 with the O ring 70 interposed therebetween. In this state, as illustrated in FIG. 7, the O ring 70 is compressed in the axial direction. Since the O ring 70 that is easier to undergo elastic deformation than the base member 21 is intentionally deformed, the load applied to the base member 21 is reduced. Consequently, the occurrence of damage to the disc portion 211, the inner wall portion 212, or the outer wall portion 213 of the base member 21 under the load applied from the second mold 62 is suppressed.

In particular, in the embodiment, the outer wall portion 213 having an annular shape is provided on the upper surface of the base member 21. Hence, the peripheral edge portion of the base member 21 has higher rigidity than in a case where the outer wall portion 213 is not provided. Therefore, the occurrence of damage to the base member 21 under the load applied from the second mold 62 is further suppressed.

The O ring 70 does not overlap the circuit board 24 in the axial direction. Furthermore, the outer wall portion 213 that supports the O ring 70 is not directly connected to the circuit board 24. Hence, the load applied from the second mold 62 to the O ring 70 is less likely to be transmitted to the circuit board 24. Therefore, the occurrence of deformation of the circuit board 24 under the load from the second mold 62 is suppressed.

In step S3 described above, the O ring 70 has a function of preventing the molten resin from leaking toward the radially outer side. The mold resin portion 25 is positioned on the radially inner side with respect to the outer edge of the O ring 70. As illustrated in FIG. 6, in the embodiment, the O ring 70 is positioned in such a manner as to overlap, in the axial direction, an inner periphery 621 of the lower end surface of the second mold 62. Hence, in plan view, the outer periphery of the finished mold resin portion 25 overlaps at least part of the O ring 70. That is, at least part of the O ring 70 is positioned on the radially outer side with respect to the mold resin portion 25.

If the entirety of the O ring 70 is positioned on the radially outer side with respect to the inner periphery 621 of the lower end surface of the second mold 62, a small gap is provided between the base member 21 and the second mold 62 on the radially inner side with respect to the O ring 70. Hence, the finished motor 1 is supposed to have a thin resin film on the radially inner side with respect to the O ring 70. Such a thin film tends to peel off the base member 21. In contrast, in the structure according to the embodiment, no such thin resin film is formed on the radially inner side with respect to the O ring 70.

As illustrated in FIG. 6, the O ring 70 according to the embodiment is positioned at a distance from and on the radially inner side with respect to a peripheral edge 215 of the upper surface of the base member 21. If the O ring 70 is provided at the very outer edge of the upper surface of the base member 21, part of the O ring 70 that is compressed may be pushed into the gap between the first mold 61 and the second mold 62. In such an event, the first mold 61 and the second mold 62 do not completely come into surface contact with each other, resulting in a possible cause for reduced accuracy in the molding of the mold resin portion 25. In contrast, in the structure according to the embodiment, the O ring 70 that is compressed may spread slightly in the radially outer side but is less likely to be pushed into the gap between the first mold 61 and the second mold 62. Hence, the upper end surface of the first mold 61 and the lower end surface of the second mold 62 can be accurately brought into contact with each other.

According to the embodiment, as represented by the broken lines in FIGS. 4 and 5, the second mold 62 has the gate 63 as described above. The gate 63 extends through the second mold 62 from the outer peripheral surface to the inner peripheral surface within part of the second mold 62 in the peripheral direction. Hence, as illustrated in FIGS. 1 and 8, the finished mold resin portion 25 has a gate resultant 251 as a resultant of the gate 63 on part of the outer peripheral surface thereof. The gate resultant 251 is positioned below the circuit board 24 in the axial direction and above the base member 21 in the axial direction.

Since the gate 63 is provided at the above-described position, the cavity 60 can be filled with the resin without generating bubbles near various electronic components mounted on the circuit board 24. Furthermore, the gate resultant 251 is positioned below the rotor unit 3 and the impeller 5. Therefore, the gate resultant 251 can be prevented from interfering with the rotor unit 3 or the impeller 5.

The gate may alternatively be provided in the first mold 61. For example, the base member 21 may have a through hole extending therethrough in the axial direction, and a gate may be provided at a position of the first mold 61 that faces the through hole in the axial direction. In such a case, a gate resultant is formed at a position of the lower surface of the mold resin portion 25 that is within the through hole of the base member 21 in plan view.

While an exemplary embodiment of the present disclosure has been described above, the present disclosure is not limited to the above embodiment.

Figure 10:
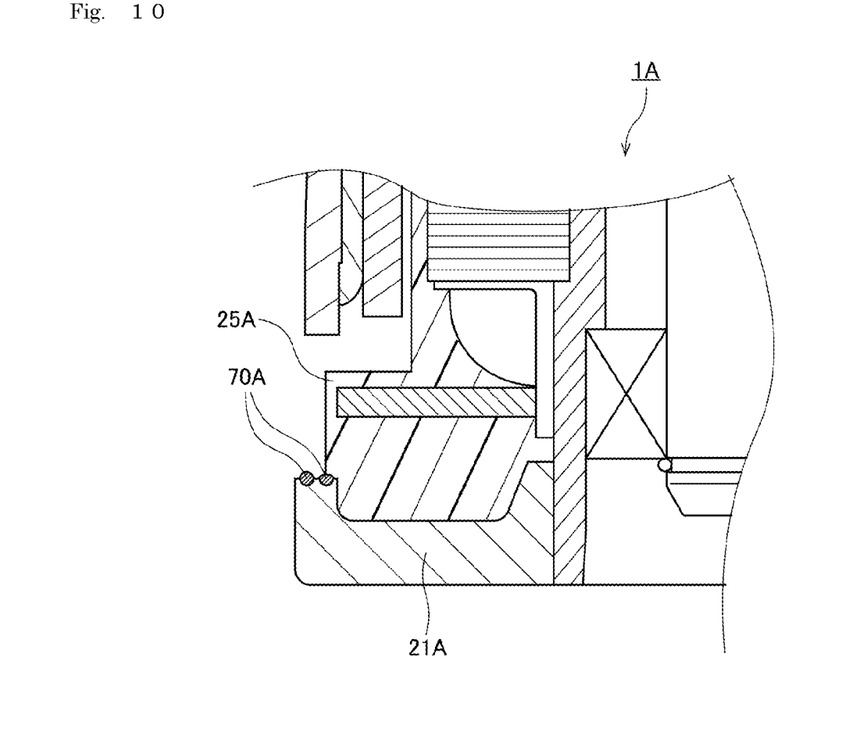
FIG. 10 is a vertical sectional view of relevant part of a motor according to a first modification.
Figure 11:
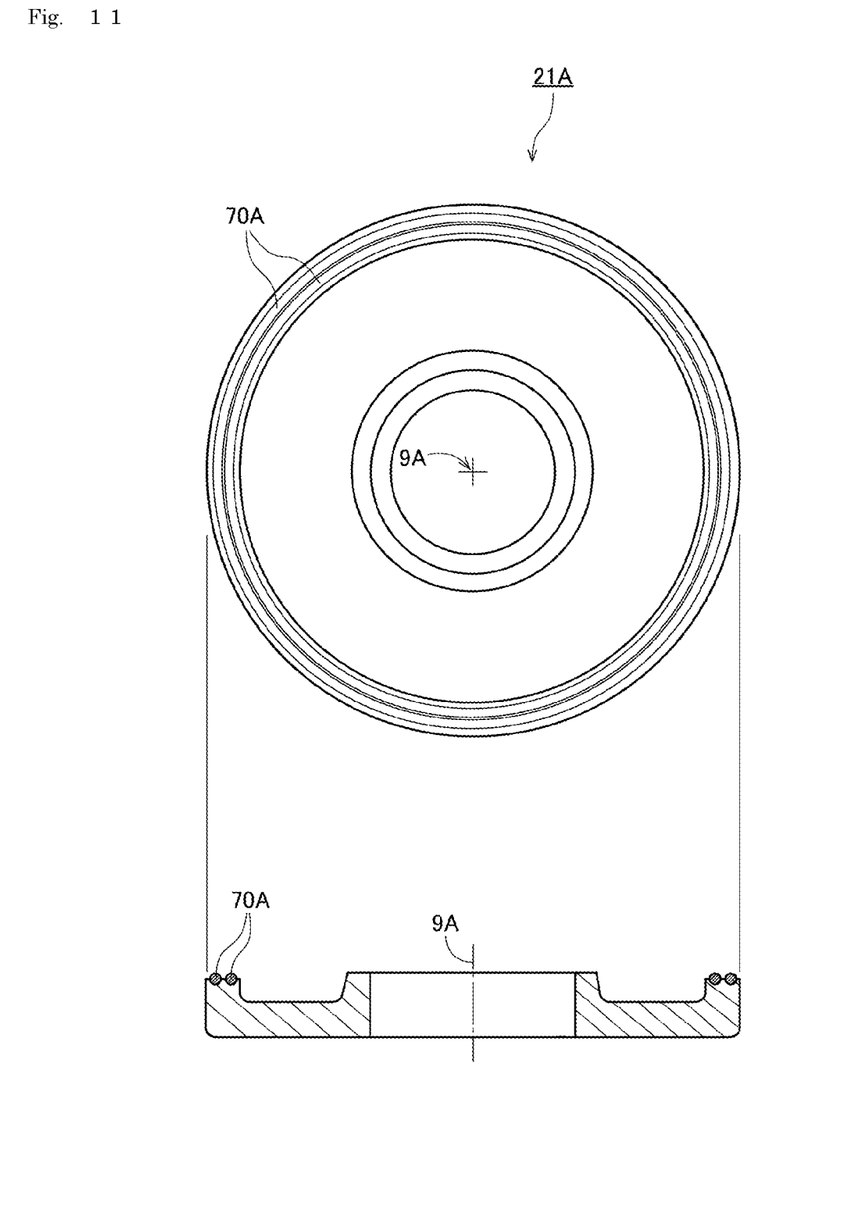
FIG. 11 includes a top view and a vertical sectional view of a base member according to the first modification.

FIG. 10 is a vertical sectional view of relevant part of a motor 1A according to a first modification. FIG. 11 includes a top view and a vertical sectional view of a base member 21A according to the first modification. In the first modification illustrated in FIGS. 10 and 11, the base member 21A has two O rings 70A. The two O rings 70A each have an annular shape that is centered at a center axis 9A. The two O rings 70A have different diameters. With a plurality of such annular O rings 70A arranged concentrically and having different diameters, the leakage of molten resin toward the radially outer side in the process of forming a mold resin portion 25A can further be suppressed.

Figure 12:
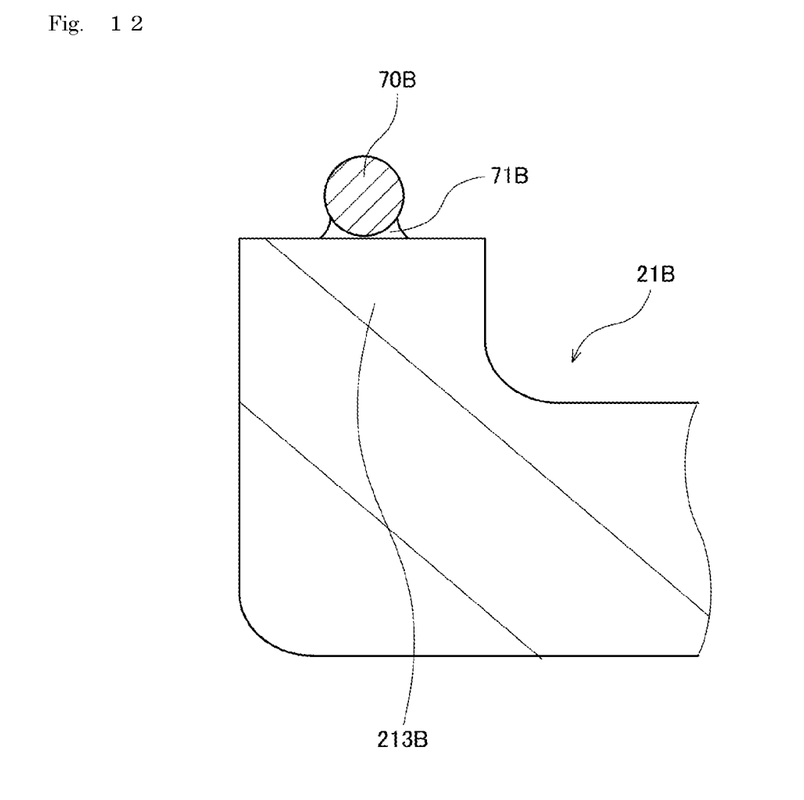
FIG. 12 is a vertical sectional view of relevant part of a motor according to a second modification and illustrates a base member and an O ring.

FIG. 12 is a vertical sectional view of relevant part of a motor according to a second modification and illustrates a base member 21B and an O ring 70B. In the second modification illustrated in FIG. 12, the upper surface of an outer wall portion 213B of the base member 21B is a groove-less flat surface, and the O ring 70B is fixed to the upper surface of the outer wall portion 213B with adhesive 71B. That is, the base member 21B does not need to have a groove that holds the O ring 70B. The adhesive 71B interposed between the upper surface of the outer wall portion 213 and the O ring 70B suppresses the displacement of the O ring 70B with respect to the base member 21B.

Figure 13:
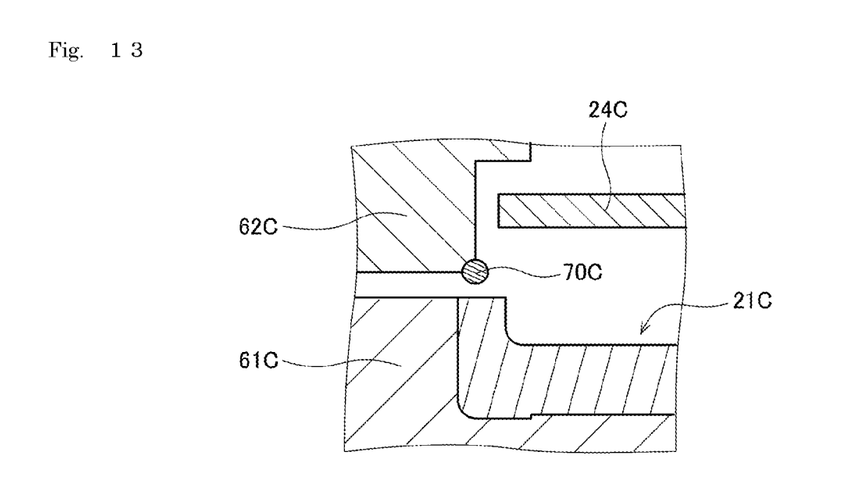
FIG. 13 is a vertical sectional view of relevant part of a motor according to a third modification and illustrates a base member, a circuit board, a first mold, and a second mold.

FIG. 13 is a vertical sectional view of relevant part of a motor according to a third modification and illustrates a base member 21C, a circuit board 24C, a first mold 61C, and a second mold 62C. In the third modification illustrated in FIG. 13, an O ring 70C is provided on the second mold 62C, not on the base member 21C. Specifically, the O ring 70C, which is an elastic member, is fixed to the inner periphery of the lower end surface of the second mold 62C. Lower part of the O ring 70C projects downward from the lower end surface of the second mold 62C. In such a configuration also, the O ring 70C can be interposed between the upper surface of the base member 21C and the lower surface of the second mold 62C when the first mold 61C and the second mold 62C are joined together. Hence, the occurrence of damage to the base member 21C under the load applied from the second mold 62C is suppressed.

If the O ring 70C is provided on the second mold 62C as illustrated in FIG. 13, the O ring 70C can be removed from the finished stator unit. Hence, there is no need to prepare the O ring 70C for each of a number of motors to be manufactured.

The above embodiment and the modifications thereof each employ an O ring as an elastic member. Alternatively, the elastic member to be interposed between the base member and the second mold may be any elastic member other than a commercially available component called O ring. Moreover, the elastic member only needs to be elastic at least during the manufacturing process. That is, the elastic member may lose its elasticity with aging or the like once the motor is finished.

The details in the shape of each of the members may be different from those illustrated in the drawings provided for the present disclosure.

The present disclosure is applicable to, for example, a stator unit, a motor, and a method of manufacturing a stator unit.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator unit included in a motor, the stator unit comprising:
   a base member extending substantially perpendicularly to a center axis extending vertically;
   an armature positioned above the base member;
   a circuit board positioned above the base member and electrically connected to the armature; and
   a mold resin portion covering the armature and the circuit board,
   wherein the base member has an elastic member on a radially outer side with respect to the circuit board in plan view,
   at least part of the elastic member is positioned on the radially outer side with respect to the mold resin portion,
   the elastic member has an annular shape that is centered at the center axis, and
   the mold resin portion is provided on a radially inner side with respect to an outer edge of the elastic member, with an outer periphery of the mold resin portion overlapping at least part of the elastic member in plan view.

2. The stator unit according to claim 1, wherein at least part of the elastic member project from an upper surface of the base member.

3. The stator unit according to claim 1,
   wherein the elastic member is one of a plurality of elastic members provided on the base member, and
   wherein the plurality of elastic members are centered at the center axis and have different diameters.

4. The stator unit according to claim 1,
   wherein the elastic member is a ring-shaped resin member.

5. The stator unit according to claim 1,
   wherein the base member has a groove in an upper surface, the groove being positioned on the radially outer side with respect to the circuit board, and
   wherein part of the elastic member is fitted in the groove.

6. The stator unit according to claim 1, further comprising:
   adhesive interposed between an upper surface of the base member and the elastic member.

7. The stator unit according to claim 1,
   wherein the base member has an annular wall portion on an upper surface, and
   wherein the elastic member is positioned on an upper surface of the wall portion.

8. The stator unit according to claim 1,
   wherein the elastic member is positioned on a radially inner side with respect to a peripheral edge of an upper surface of the base member.

9. The stator unit according to claim 1,
   wherein the mold resin portion has a gate resultant on an outer peripheral surface.

10. The stator unit according to claim 9,
    wherein the gate resultant is positioned below the circuit board in an axial direction and above the base member in the axial direction.

11. The stator unit according to claim 1,
    wherein the mold resin portion has a gate resultant on a lower surface.

12. The stator unit according to claim 11,
    wherein the base member has a through hole extending through the base member in the axial direction, and
    wherein the gate resultant is provided at a position of the lower surface of the mold resin portion that is within the through hole in plan view.

13. The stator unit according to claim 1, further comprising:
    a bearing housing having a cylindrical shape extending along the center axis,
    wherein the armature is fixed to an outer peripheral surface of the bearing housing, and
    wherein the base member is positioned below the armature and is fixed to the outer peripheral surface of the bearing housing.

14. The stator unit according to claim 13,
    wherein the bearing housing is made of metal.

15. The stator unit according to claim 13,
    wherein the bearing housing is made of resin.

16. A motor comprising:
    the stator unit according to claim 1; and
    a rotor unit supported in such a manner as to be rotatable about the center axis and having pole faces that each face the armature in a radial direction.

* * * * *